UNITED STATES PATENT OFFICE.

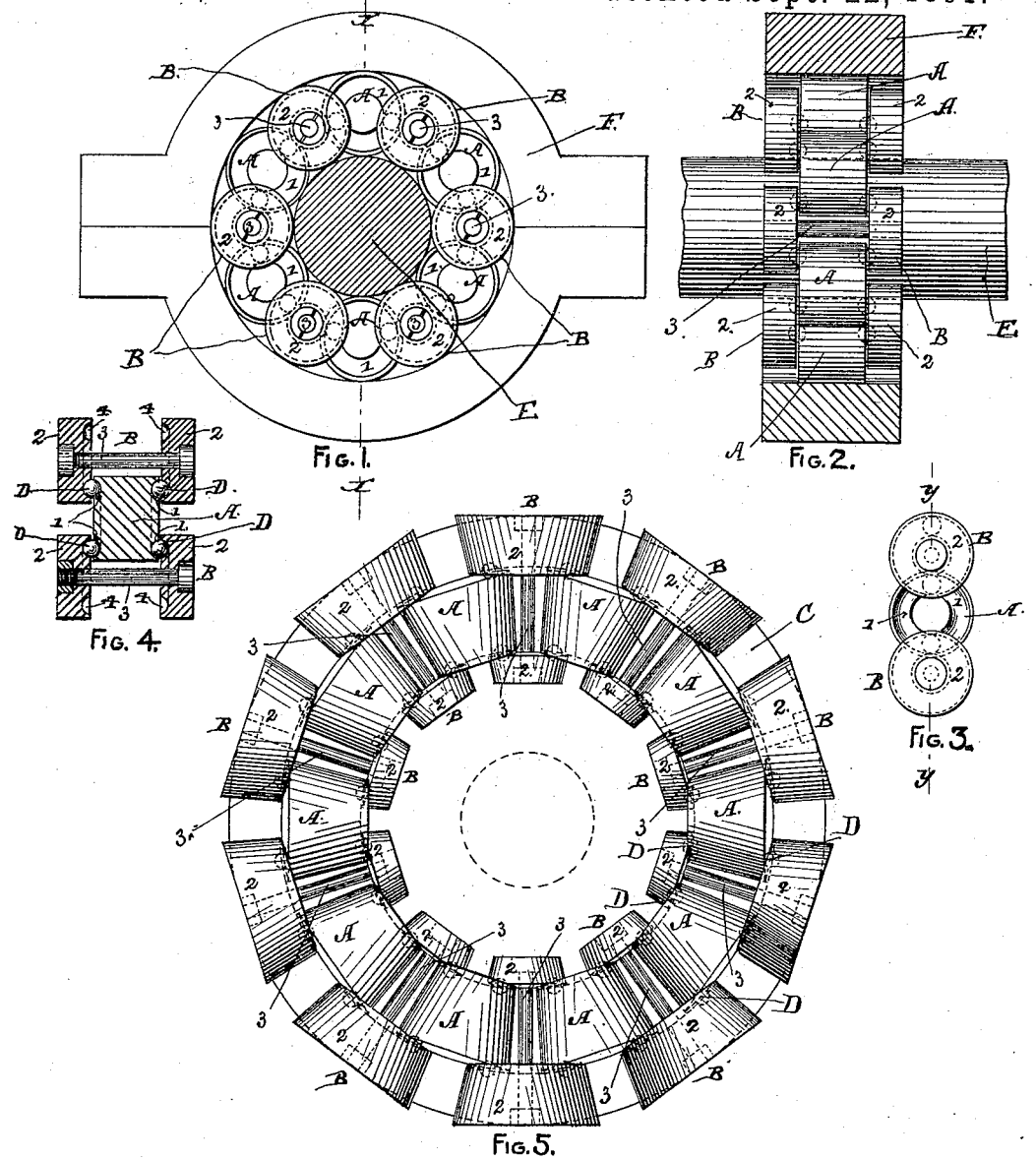

FRANK VAN BENTHUYSEN, OF ALBANY, NEW YORK.

ROLLER-BEARING.

SPECIFICATION forming part of Letters Patent No. 459,774, dated September 22, 1891.

Application filed April 28, 1891. Serial No. 390,821. (No model.)

*To all whom it may concern:*

Be it known that I, FRANK VAN BENTHUYSEN, of the city and county of Albany, in the State of New York, have invented new and useful Improvements in Roller-Bearings, of which the following is a specification.

My invention relates to improvements in roller-bearings for shafts and other similar parts of machines; and the object of my invention is to provide a reliable and practically-frictionless bearing for the purposes above named. This object I attain by the mechanism illustrated in the accompanying drawings, which is herein referred to and forms part of this specification, and in which—

Figure 1 is an end elevation of my roller-bearing as adapted to a shaft-journal. Fig. 2 is a side elevation of the same, with the surrounding box or collar shown in vertical section, taken at the line X X on Fig. 1. Fig. 3 is a detached end elevation of three of the rollers ranged in a direct line. Fig. 4 is a vertical section of Fig. 3 at the line Y Y. Fig. 5 is a front elevation of my roller-bearing adapted to the requirements of a thrust-bearing for receiving an endwise pressure of a shaft; and Fig. 6 is a sectional view, on a reduced scale, showing the arrangement of conical rollers and coniform disks of said thrust-bearing.

My roller-bearing consists of an inner series of rollers, each having an annular groove in its opposite ends, a series of outer rollers of a disk form arranged in pairs and connected together at their centers, each pair of said outer rollers being formed to overlap the ends of two adjacent rollers of the inner series, and the inner faces of the disks of the outer rollers having an annular groove which conforms to like grooves in the ends of the inner series of rollers, and a series of spherical rollers, of which a pair is arranged in each annular groove in the ends of the inner series of rollers, so as to engage in the annular groove of the overlapping disks of the outer series of rollers, said spherical rollers or balls forming a series of frictionless pivots for retaining the inner and outer series of rollers in their proper relation to each other.

As represented in the drawings, A designates the inner rollers, which may be cylindrical, as shown in Figs. 1, 2, 3, and 4, or coniform, as shown in Figs. 5 and 6. Each of said inner rollers has an annular groove or gutter 1 formed in its opposite ends. Said grooves in both ends of the cylindrical rollers should be made of a corresponding diameter in all of said rollers; but the grooves in the opposite ends of the coniform inner rollers must be made to conform to the different diameters of the opposite ends of said rollers; but all of said grooves or depressions must be formed concentrically to the axis of the rollers in which they are made.

B designates the outer rollers, which are composed of two disks or heads 2, connected together by a central bolt 3, which, when the two series of rollers are placed in position, occupy a space formed between two adjacent inner rollers. In Figs. 1, 2, 3, and 4 the disks 2 are made cylindrical, of equal diameters, which correspond to the diameter of the inner rollers A. In Figs. 5 and 6 the disks 2 are made coniform, their diameters agreeing with divergent lines drawn from center of the disk or flange C on which said rollers have their bearing; but all the rollers of the series must have a uniform size and shape—that is to say, one of said rollers must be the exact duplicate of the others to produce the best effect. The inner face of each disk 2 is provided with an annular groove 4, which corresponds in diameter to the diameter of the groove in the adjacent end of the inner roller.

D designates spherical rollers or balls, which are placed in the annular grooves of the bearing-rollers, two of said balls being placed in each annular groove in the inner rollers, so that the annular groove in the overlapping head of an outer roller will engage one of said balls, as shown in Fig. 4, said balls forming frictionless pivots between the inner and outer rollers, and also forming a means whereby the two series of rollers are retained in a required relation to each other.

E designates the shaft which rotates in the roller-bearing shown in Figs. 1 and 2, and F is the box or casing for said roller-bearing.

G designates a shaft carrying the coniform disk or flange C, said disk being fitted to rotate with said shaft and to form part of a thrust-bearing which bears against the coniform inner and outer rollers. A non-revoluble disk H, of a coniform shape, forms the stationary head of said thrust-bearing and receives the endwise pressure applied to the shaft G.

The inner and outer rollers A and B, together with the spherical rollers D, form an interlocking series of rollers which can only be separated from each other by removing the central bolts 3 from the outer rollers.

What I claim as my invention, and desire to secure by Letters Patent, is—

1. A roller-bearing consisting of a series of inner rollers, a series of outer rollers, and a series of spherical rollers, substantially as herein described, each of said inner rollers being provided with a concentric groove or channel in each of its opposite ends, each of said outer rollers being formed of a pair of disks which are secured together by a central bolt, so as to overlap the ends of the adjacent pair of inner rollers, each of said disks having a concentric groove or channel in its inner face, and said spherical rollers being placed in the concentric grooves of the inner and outer rollers, so as to form a frictionless locking mechanism between the inner and outer rollers, as and for the purpose herein specified.

2. In a roller-bearing, the combination of two coniform disks, one of said disks being revoluble and the other stationary, a series of coniform inner rollers, each having a concentric groove or channel in its opposite ends, a series of outer rollers composed of a pair of coniform disks secured together by a central bolt, each of said disks having a concentric groove or channel in its inner face, and a series of spherical rollers arranged in said concentric grooves, substantially as and for the purpose herein specified.

FRANK VAN BENTHUYSEN.

Witnesses:
WM. H. LOW,
S. B. BREWER.